(12) United States Patent
Shrestha et al.

(10) Patent No.: US 11,025,135 B2
(45) Date of Patent: Jun. 1, 2021

(54) ELECTRICAL MACHINE WITH LIQUID COOLING

(71) Applicant: ABB Schweiz AG, Baden (CH)

(72) Inventors: Ghanshyam Shrestha, Cary, NC (US); Colin E. Tschida, Durham, NC (US)

(73) Assignee: ABB Schweiz AG, Baden (CH)

( * ) Notice: Subject to any disclaimer, the term of this patent is extended or adjusted under 35 U.S.C. 154(b) by 441 days.

(21) Appl. No.: 16/031,829

(22) Filed: Jul. 10, 2018

(65) Prior Publication Data

US 2020/0021169 A1 Jan. 16, 2020

(51) Int. Cl.
*H02K 3/24* (2006.01)
*H02K 9/19* (2006.01)
*H02K 1/32* (2006.01)
*H02K 5/20* (2006.01)

(52) U.S. Cl.
CPC ............. *H02K 9/19* (2013.01); *H02K 1/32* (2013.01); *H02K 3/24* (2013.01); *H02K 5/20* (2013.01)

(58) Field of Classification Search
CPC H02K 7/183; H02K 3/34; H02K 3/14; H02K 3/12; H02K 3/04; H02K 3/28; H02K 21/22; H02K 15/0478; H02K 15/085; H02K 1/165; H02K 1/27; H02K 1/24; H02K 9/16; H02K 9/19; H02K 9/18; H02K 9/197; H02K 9/20; H02K 9/06; H02K 5/20; H02K 5/02; H02K 5/04; H02K 5/08; H02P 21/30
See application file for complete search history.

(56) References Cited

U.S. PATENT DOCUMENTS

| | | | |
|---|---|---|---|
| 4,311,932 A | 1/1982 | Olson | |
| 2012/0104884 A1* | 5/2012 | Wagner | H02K 5/20 310/54 |
| 2012/0256501 A1 | 10/2012 | Burnett et al. | |
| 2012/0274159 A1* | 11/2012 | Le Besnerais | H02K 9/22 310/54 |
| 2013/0015730 A1 | 1/2013 | Waddell et al. | |

(Continued)

OTHER PUBLICATIONS

Remy International, Inc., Remy Hybrid Application Manual Rev. 2.0 (28 pages) https://www.remyinc.com/docs/HVH250R4.com (no date provided).

(Continued)

*Primary Examiner* — Bryan R Perez
(74) *Attorney, Agent, or Firm* — Taft Stettinius & Hollister LLP (57) ABSTRACT

An electrical machine includes a stator including a plurality of stator windings; and a rotor in magnetic cooperation with the stator. The rotor includes a plurality of cooling passages extending therethrough, each cooling passage including an inlet for receiving oil and an outlet for discharging the oil. The electrical machine includes a rotating oil distribution member coupled to the rotor, the oil distribution member including a radially inward portion and a radially outward portion, the radially outward portion being disposed adjacent to the inlets of the plurality of cooling passages. A stationary oil delivery nozzle is constructed to discharge oil toward the radially inward portion of the oil distribution member. The oil distribution member is constructed to receive the oil discharged by the oil delivery nozzle, and to direct the oil to the inlets of the cooling passages to cool the rotor.

20 Claims, 4 Drawing Sheets

(56) References Cited

U.S. PATENT DOCUMENTS

| | | | |
|---|---|---|---|
| 2016/0164377 A1* | 6/2016 | Gauthier | ............ H02K 9/19 |
| | | | 310/54 |
| 2016/0197536 A1 | 7/2016 | Mayor et al. | |
| 2017/0126084 A1 | 5/2017 | Schweinert | |

OTHER PUBLICATIONS

Dynamic E Flow, Capcooltech Technology (2 pages) http://www.dynamiceflow.com, 2017.

* cited by examiner

ELECTRICAL MACHINE WITH LIQUID COOLING

TECHNICAL FIELD

The present application relates generally to electrical machines and more particularly, but not exclusively, to electrical machines with liquid cooling.

BACKGROUND

Electrical machines remain an area of interest. Some existing systems have various shortcomings, drawbacks and disadvantages relative to certain applications. For example, in some electrical machine configurations, power density may be increased by providing cooling. Accordingly, there remains a need for further contributions in this area of technology.

SUMMARY

One embodiment of the present invention is a unique electrical machine. Another embodiment is another unique electrical machine. Other embodiments include apparatuses, systems, devices, hardware, methods, and combinations for electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
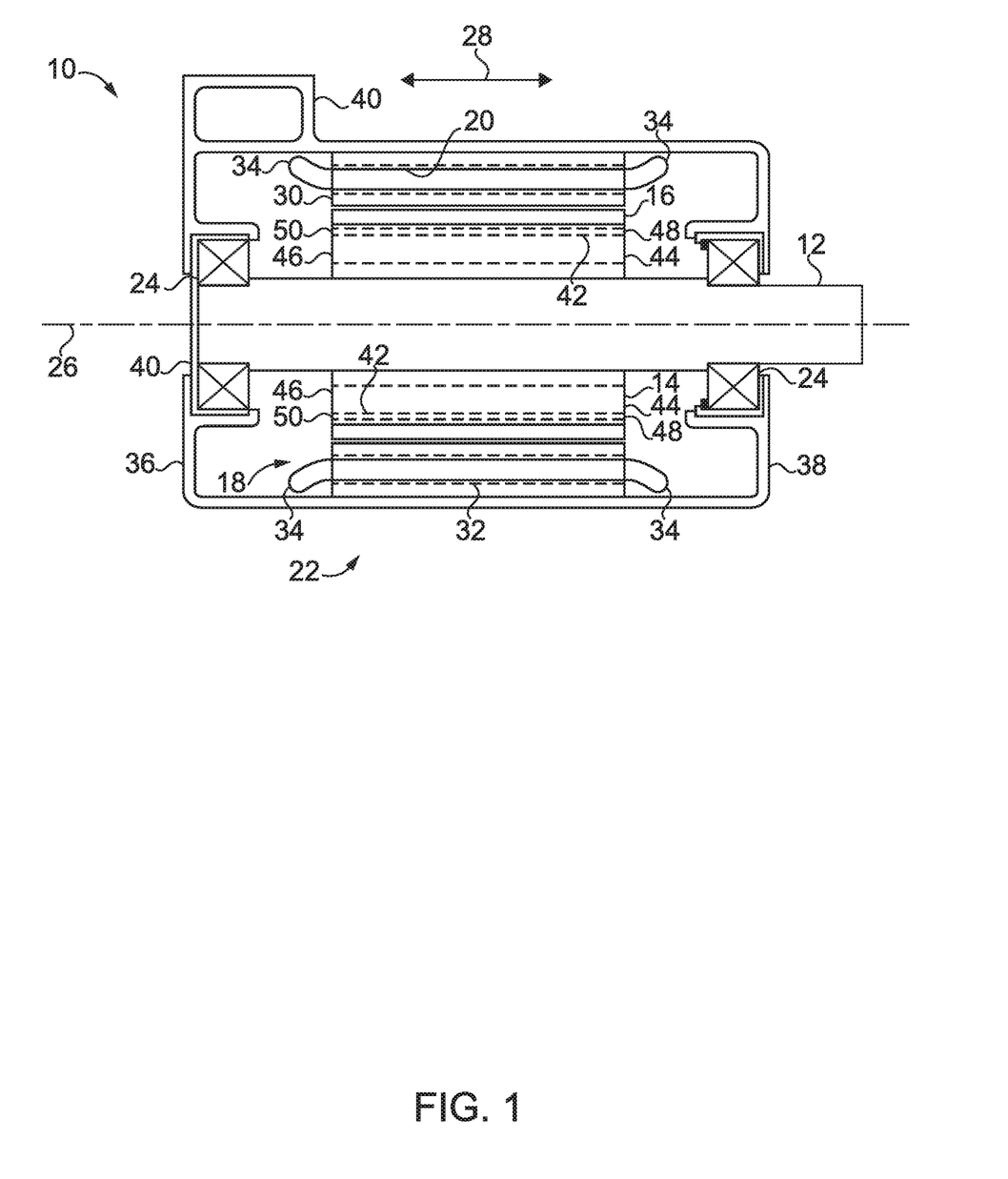
FIG. 1 schematically illustrates some aspects of a non-limiting example of an electrical machine in accordance with an embodiment of the present invention.

Referring to FIG. 1, some aspects of a non-limiting example of an electrical machine 10 in accordance with an embodiment of the present invention are schematically depicted. In one form, electrical machine 10 is an internal permanent magnet (IPM) motor employing rare earth magnets. In other embodiments, electrical machine 10 may be an external permanent magnet motor. In still other embodiments, electrical machine 10 may be an induction motor, a switched reluctance, synchronous reluctance, or permanent magnet assisted reluctance motor, a permanent magnet motor, or any other type of motor, generator or motor/generator. In various embodiments, electrical machine 10 may be a radial flux machine, an axial flux machine or a machine having a three-dimensional (3D) flux path. In one form, electrical machine 10 is an industrial electrical machine, e.g., an industrial motor. In other embodiments, electrical machine 10 may not be an industrial electrical machine.

Electrical machine 10 includes a shaft 12, a rotor 14 having permanent magnets (poles) 16, a stator 18 having a plurality of stator windings 20, a housing 22 and bearings 24. Shaft 12 and rotor 14 rotate about an axis of rotation 26, which defines an axial direction 28. In one form, shaft 12 is coupled or affixed to rotor 14. In other embodiments, shaft 12 may be integral with rotor 14. Shaft 12 rotates with rotor 14, and may be considered a part of rotor 14.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 24. Shaft 12 and bearings 24 define axis of rotation 26 and corresponding axial direction 28.

Rotor 14 and stator 18 are in magnetic communication with each other. Rotor 14 is in magnetic cooperation with stator 18 to develop torque. Each of rotor 14/poles 16 and stator 18 have a construction that is operative to direct magnetic flux toward and away from each other. In some embodiments, rotor 14 may include other operative sources of magnetic flux, e.g., bus bars, windings or both, in conjunction with or in place of permanent magnets 16.

Stator 18 includes a laminated stator core 30. Stator windings 20 are disposed within passages 32 in laminated stator core 30. In one form, stator windings 20 are copper conductors. In other embodiments, aluminum and/or other conductor materials may be employed in addition to or in place of copper. Stator windings 20 are constructed for magnetic communication and cooperation with poles 16. Stator windings 20 have overhangs 34 that extend beyond the ends of stator core 30, e.g., extend to the left and to the right of stator core 30 (in the perspective of the view of FIG. 4).

Housing 22 includes an endplate 36 disposed at one end of housing 22 and a second endplate 38 disposed at the other end of housing 22. In one form, endplate 36 is a non-drive end endplate, and endplate 38 is a drive-end endplate, or pulley endplate. In other embodiments, endplate 36 may be the drive-end endplate, and endplate 38 may be the non-drive end endplate. One or both of endplates 36 and 38 may be integral with housing 22. In some embodiments, housing 22 also includes a conduit box 40, which may or may not be integral, depending upon the embodiment. Other embodiments may not include a conduit box.

Bearings 24 are constructed to react shaft 12 and rotor 14 axial or thrust loads in axial direction 28, and to react shaft 12 and rotor 14 radial loads perpendicular to axis of rotation 26. Housing 22 is constructed to enclose stator 18 and react loads associated with stator 18, e.g., torque loads and any other loads generated due to magnetic interaction between stator 18 and rotor 14 during the operation of electrical machine 10. Housing 22 is also constructed to react thrust loads delivered through bearings 24.

In order to increase the power density of electrical machine 10, it is desirable to provide cooling, e.g., liquid cooling. Accordingly, embodiments of electrical machine 10 include provisions for providing liquid cooling of rotor 14 and/or of stator 18, e.g., of the stator windings 20, in particular, the winding overhangs 34. For example, rotor 14 includes a plurality of cooling passages 42 extending therethrough from one end 44 of rotor 14 to the other end 46 of rotor 14. In one form, the cooling passages 42 are oil-cooling passages for passing oil to remove heat from rotor 14. In other embodiments, other liquids or fluids may be used as heat transfer fluids. Each cooling passage 42 includes an inlet 48 for receiving cooling oil and an outlet 50 for discharging the oil.

Figure 2:
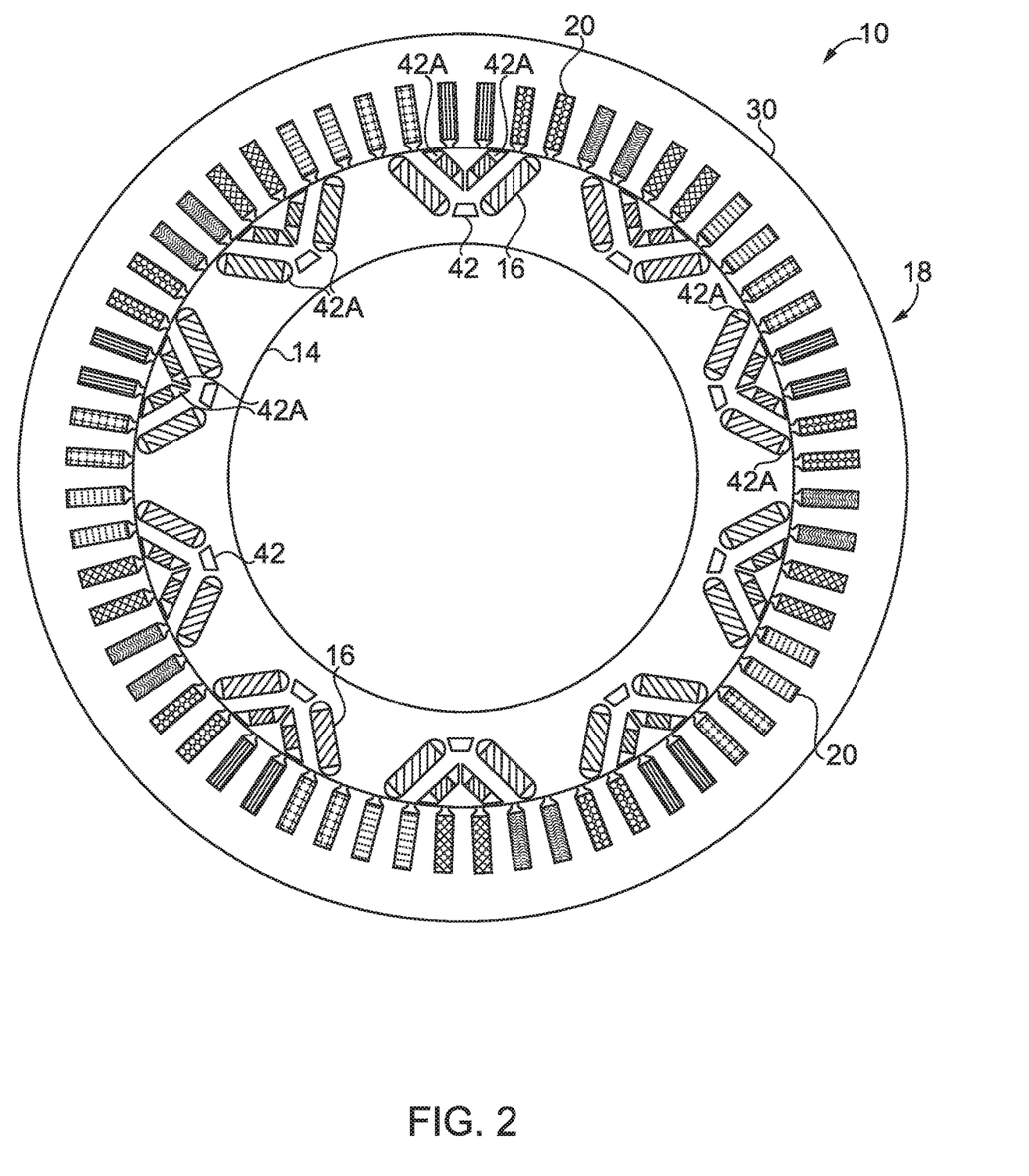
FIG. 2 schematically illustrates a cross-sectional view of some aspects of a non-limiting example of a rotor and a stator of an electrical machine in accordance with an embodiment of the present invention.

Referring also to FIG. 2, non-limiting examples of cooling passages 42 for an IPM rotor 14 are illustrated. In the example of FIG. 2, air pockets between permanent magnets 16 are used as cooling passages 42. The shape of cooling passages 42 may vary with the needs of the application. In other embodiments, cooling passages 42 may also or alternatively be formed at other locations. For instance, in another non-limiting example, cooling passages may be formed in air pockets adjacent to permanent magnets 16 in the same cavities in which the permanent magnets 16 are located, such as cooling passages 42A. The shape of cooling passages 42A may vary with the needs of the application. For surface-mounted permanent magnet rotors, cooling passages 42 may be disposed between and/or radially inward of the permanent magnets.

Figure 3:
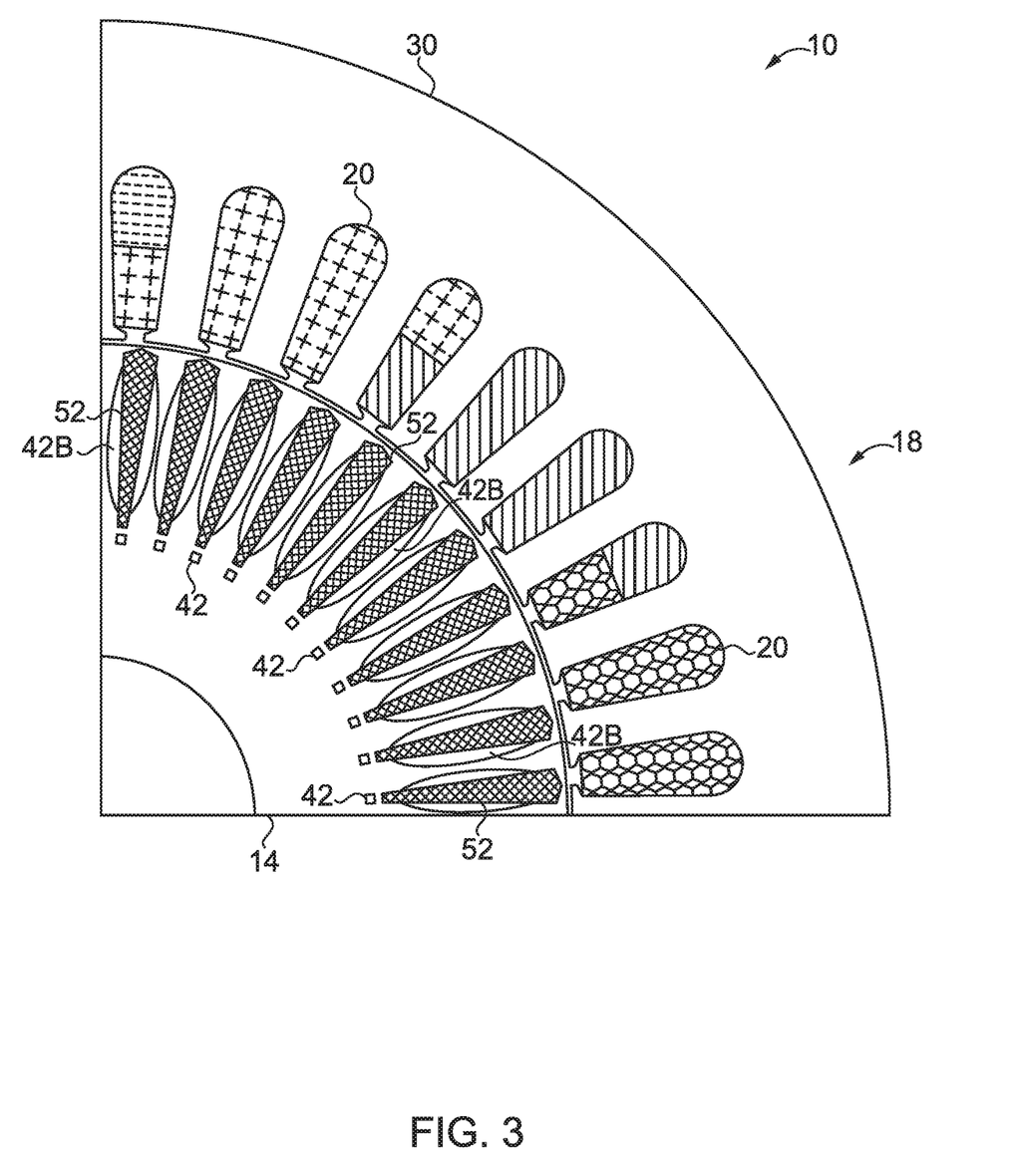
FIG. 3 schematically illustrates a cross-sectional view of some aspects of a non-limiting example of a rotor and a stator of an electrical machine in accordance with an embodiment of the present invention.

Referring also to FIG. 3, non-limiting examples of cooling passages 42 for an induction rotor 14 are illustrated. In the example of FIG. 3, cooling passages 42 are formed radially inward of induction rotor windings or bars 52. In other embodiments, cooling passages 42 may also or alternatively be formed at other locations. For instance, in another non-limiting example, cooling passages may be formed in air pockets adjacent to rotor windings or bars 52 in the same cavities in which the rotor windings or bars 52 are disposed, such as cooling passages 42B. The shape of cooling passages 42B may vary with the needs of the application.

Figure 4:
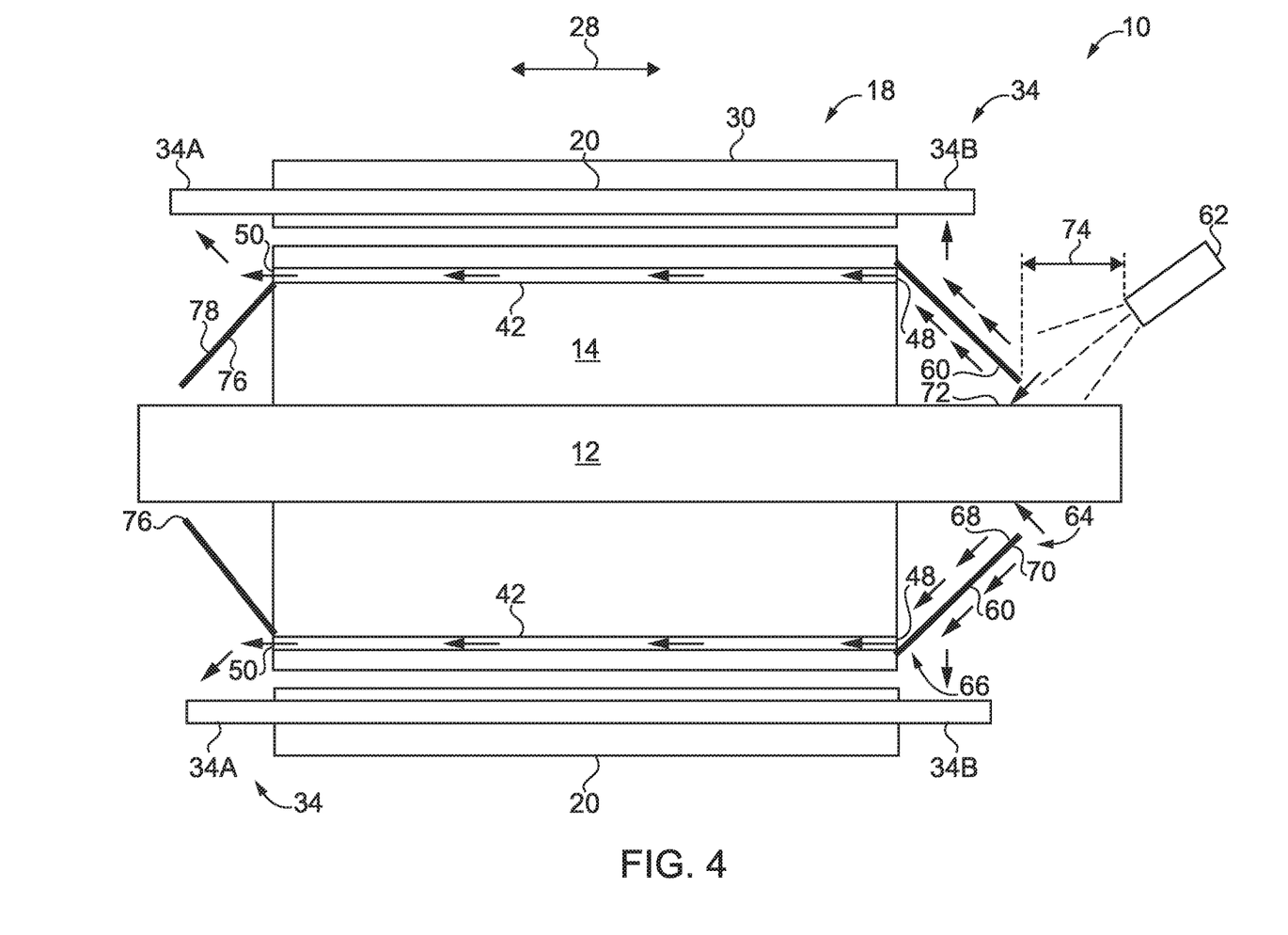
FIG. 4 schematically illustrates some aspects of a non-limiting example of an electrical machine in accordance with an embodiment of the present invention.

Referring also to FIG. 4, some aspects of a non-limiting example of electrical machine 10 in accordance with an embodiment of the present invention are illustrated. In the embodiment of FIG. 4, electrical machine 10 includes an end plate in the form of an oil distribution member 60, and at least one oil delivery nozzle 62. In one form, oil delivery nozzle 62 is stationary, and directs oil across an air gap to a rotating oil distribution member 60. Oil distribution member 60 has a radially inward portion 64 and a radially outward portion 66. Radially outward portion 66 is disposed adjacent to the inlets 48 of the cooling passages 42, e.g., adjacent to and radially outward from inlets 48. Oil delivery nozzle 62 is constructed to discharge and direct oil toward radially inward portion 64 of oil distribution member 60. The oil discharged by oil delivery nozzle 62 may be in the form of one or more oil sprays, one or more oil streams and/or one or more oil drips. Oil distribution member 60 is constructed to receive the oil discharged by oil delivery nozzle 62, and to direct the oil to inlets 48 of cooling passages 42 to cool rotor 14.

Oil distribution member 60 is coupled to rotor 14, and is constructed to rotate with rotor 14. In some embodiments, all or part of oil distribution member 60 may be integral with or part of rotor 14. In one form, oil distribution member 60 is conical, e.g., cone shaped or the frustum of a hollow cone. The cone angle may vary with the needs of the application. In other embodiments, oil distribution member 60 may have any suitable geometric shape, another non-limiting example of which may be a bucket shape. Oil distribution member 60 includes an inner surface 68 and an outer surface 70. Oil delivery nozzle 62 is constructed to direct oil to the inner surface 68 of oil distribution member 60. For example, in some embodiments, oil delivery nozzle 62 is spaced apart axially from oil distribution member 60, e.g., across an air gap, and for example, is located to the right of oil distribution member 60 in the depiction of FIG. 4. In such embodiments, oil delivery nozzle 62 may be constructed to direct the oil to a rotating surface 72, e.g., of rotor 14 or shaft 12. Rotating surface 72 is constructed to sling the oil radially outward and into contact with inner surface 68 of oil distribution member 60. In other embodiments, oil delivery nozzle 62 may be located radially inward of all or a portion of oil distribution member 60, and may direct oil directly at inner surface 68 of oil distribution member 60. Rotating oil distribution member 60 is constructed to trap the oil received from oil delivery nozzle 62 using inner surface 68 and to increase the pressure of the oil, e.g., in the manner of a centrifugal pump, and to supply the pressurized oil to inlets 48 of cooling passages 42 with enough pressure to force the oil through cooling passages 42. Rotating oil distribution member 60 traps the oil radially, and traps the oil axially in such a manner as to prevent oil flow in a direction away from the rotor, and permit pressure buildup due to centrifugal force. Cooling passages 42 permit the trapped oil to escape through the body of the rotor, providing cooling to the rotor.

Oil distribution member 60 is constructed to drive the cooling oil received from oil delivery nozzle 62 into the inlets 48 of cooling passages 42, and along and through cooling passages 42 to cool rotor 14, and to discharge the oil from outlets 50 of cooling passages 42, e.g., based on the oil pressure generated by oil distribution member 60. For example, due to the location of the cone-shaped radially outward portion 66 of oil distribution member 60 being proximate to inlets 48 of cooling passages 42 and inner surface 68 being radially outward of inlets 48, the oil pressurized by oil distribution member 60 is driven by the pressure into inlets 48 of cooling passages 42, is driven along the length of cooling passage 42 and is then discharged out of cooling passages 42 at outlets 50 of cooling passages 42. A subset of stator winding overhangs 34, i.e., stator winding overhangs 34A, are disposed at least partially directly radially outward of outlets 50 of cooling passages 42. Outlets 50 are constructed to discharge the oil received from oil distribution member 60 via cooling passages 42, and to sling the oil outward, e.g., radially outward, and into contact with winding overhangs 34A on the left side of FIG. 4 to cool overhangs 34A with the oil.

In some embodiments, one or more oil delivery nozzles 62 are also or alternatively constructed to direct oil to the outer surface 70 of oil distribution member 60. In some embodiments (not shown), one or more oil delivery nozzles 62 are also or alternatively constructed and positioned to direct oil to outer surface 78 of end plate 76 to sling the oil radially outward for additional cooling of overhangs 34A. In various embodiments, the oil may be directed in the form of one or more oil streams, oil sprays and/or oil drips. In some embodiments, separate oil delivery nozzle(s) 62 may be employed to direct oil to the outer surface 70 of oil distribution member 60 and to inner surface 68 of oil distribution member 60.

Oil distribution member 60 is disposed at least partially directly radially inward of a subset of stator winding overhangs 34, i.e., stator winding overhangs 34B. Oil distribution member 60 is constructed to sling the oil outward, e.g., radially outward, and into contact with winding overhang 34B to cool winding overhang 34B with oil. Thus, in some embodiments, one or more oil delivery nozzles 62 may be employed to direct oil to both the inner surface 68 and outer surface 70 of oil distribution member 60. In some such embodiments, oil distribution member 60 may be constructed to provide oil cooling to rotor 14 and to stator windings 20, e.g., winding overhangs 34, simultaneously, by directing oil from the stationary oil delivery nozzles 62 across an air gap 74 to the rotating oil distribution member 60. In some embodiments, an end plate 76, e.g., a cone shaped end plate similar in shape to oil distribution member 60 may be employed on the opposite side of rotor 14 for balancing purposes. In other embodiments, end plate 76 may have any suitable geometric shape, or may have a different profile, e.g., a cone facing in a direction opposite to that illustrated in FIG. 4. Some embodiments may not include end plate 76. The outer region of cone shaped end plate 76 is radially inward of outlets 50 of cooling passages 42, e.g., and thus does not present an obstacle to oil flow through outlets 50 and the slinging of cooling oil onto overhangs 34A.

In some embodiments, oil delivery nozzle(s) 62 may be controlled to selectively vary the amount of oil directed to stator overhangs 34A and/or 34B, and/or vary the amount of oil directed to rotor 14, i.e., to cooling passages 42. For example, at some operating conditions, it may be desirable to direct more oil to cool stator overhangs 34A and 34B, whereas in other embodiments, it may be more desirable to direct more oil to cool rotor 14 via cooling passages 42. In some embodiments, a rotation of one or more oil delivery nozzle(s) 62 may be controlled to selectively vary the amount of oil directed to inner surface 68 and outer surface 70 of oil distribution member 60. In some embodiments, valves may be employed to control oil flow through one or more discharge openings in oil delivery nozzle(s) to vary the amount of oil directed to inner surface 68 and outer surface 70 of oil distribution member 60 and/or to vary the amount of oil directed to stator overhangs 34A and/or 34B, and/or to vary the amount of oil directed to rotor 14, i.e., to cooling passages 42.

Embodiments of the present invention include an electrical machine, comprising: a stator including a plurality of stator windings; a rotor in magnetic cooperation with the stator, the rotor including a plurality of cooling passages extending therethrough, each cooling passage including an inlet for receiving oil and an outlet for discharging the oil; a rotating oil distribution member coupled to the rotor, the oil distribution member including a radially inward portion and a radially outward portion, the radially outward portion being disposed adjacent to the inlets of the plurality of cooling passages; and a stationary oil delivery nozzle constructed to discharge oil toward the radially inward portion of the oil distribution member, wherein the oil distribution member is constructed to receive the oil discharged by the oil delivery nozzle, and to direct the oil to the inlets of the cooling passages to cool the rotor.

In a refinement, the oil distribution member is coupled to the rotor and is constructed to rotate with the rotor.

In another refinement, the oil distribution member is conical.

In yet another refinement, the stator windings include a winding overhang disposed at least partially directly radially outward of the outlets of the plurality of cooling passages; and wherein the outlets are constructed to discharge the oil and sling the oil outward and into contact with the winding overhang to cool the winding overhang with the oil.

In still another refinement, the oil distribution member includes an inner surface and an outer surface; and wherein the oil delivery nozzle is constructed to direct the oil to the inner surface.

In yet still another refinement, the oil delivery nozzle is constructed to direct the oil to a rotating surface; and wherein the rotating surface is constructed to sling the oil radially outward and into contact with the inner surface of the oil distribution member.

In a further refinement, the oil distribution member is constructed to increase a pressure of the oil received from the oil delivery nozzle.

In a yet further refinement, the oil distribution member is constructed to drive the oil into the inlets of the cooling passages, along and through the cooling passages and to discharge the oil from outlets of the cooling passages.

In a still further refinement, the oil delivery nozzle is constructed to direct the oil to the outer surface of the oil distribution member.

In a yet still further refinement, the stator windings include a winding overhang; and wherein the oil distribution member is disposed at least partially directly radially inward of the winding overhang and constructed to sling the oil outward and into contact with the winding overhang to cool the winding overhang with the oil.

In another further refinement, the oil delivery nozzle is spaced apart axially from the oil distribution member.

Embodiments of the present invention include an electrical machine, comprising: a stator having a plurality of stator windings, the stator windings including a first overhang; a rotor in magnetic cooperation with the stator; an oil distribution member coupled to the rotor, the oil distribution member being disposed at least partially directly radially inward of the first overhang; and at least one oil delivery nozzle constructed to discharge oil toward the oil distribution member, wherein the oil distribution member is constructed to sling the oil outward and into contact with the first winding overhang to cool the winding overhang with the oil.

In a refinement, the rotor includes a plurality of cooling passages extending therethrough, each cooling passage having an inlet for receiving the oil; wherein the oil distribution member is constructed to direct oil to the inlets of the cooling passages and through the cooling passages to cool the rotor.

In another refinement, the stator windings have a second winding overhang; wherein each cooling passage includes an outlet for discharging the oil, and wherein the outlets are constructed to sling the oil into contact with the second winding overhang to cool the second winding overhang with the oil.

In yet another refinement, at least one oil delivery nozzle is constructed to direct the oil to a rotating surface; and wherein the rotating surface is constructed to sling the oil radially outward and into contact with the oil distribution member.

In still another refinement, the oil distribution member is constructed to increase a pressure of the oil received from the oil delivery nozzle and supply pressurized oil to the inlets of the cooling passages.

In yet still another refinement, the oil distribution member is conical.

In a further refinement, the at least one oil delivery nozzle is spaced apart axially from the oil distribution member.

In a yet further refinement, the oil distribution member includes an inner surface and an outer surface; and wherein the at least one oil delivery nozzle is constructed to direct the oil to both the inner surface and the outer surface.

In a still further refinement, the at least one oil delivery nozzle is constructed to vary the amount of oil directed to the inner surface and to vary the amount of oil directed to the outer surface In a yet still further refinement, the oil distribution member is constructed to provide oil cooling to the rotor and to the stator windings simultaneously.

In another further refinement, the at least one oil delivery nozzle is constructed to vary the amount of oil provided to the rotor and to vary the amount of oil provided to the stator windings.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical machine, comprising:
    a stator including a plurality of stator windings;
    a rotor in magnetic cooperation with the stator, the rotor including a plurality of cooling passages extending therethrough, each cooling passage including an inlet for receiving oil and an outlet for discharging the oil;
    a rotating oil distribution member coupled to the rotor that is constructed to rotate with the rotor, the rotating oil distribution member including a radially inward portion and a radially outward portion, the radially outward portion being disposed adjacent to the inlets of the plurality of cooling passages; and
    a stationary oil delivery nozzle constructed to discharge oil toward the radially inward portion of the rotating oil distribution member, wherein the rotating oil distribution member is constructed to receive the oil discharged by the oil delivery nozzle, and to direct the oil to the inlets of the cooling passages to cool the rotor.

2. The electrical machine of claim 1, wherein the rotating oil distribution member is conical.

3. The electrical machine of claim 1, wherein the stator windings include a winding overhang disposed at least partially directly radially outward of the outlets of the plurality of cooling passages; and wherein the outlets are constructed to discharge the oil and sling the oil outward and into contact with the winding overhang to cool the winding overhang with the oil.

4. The electrical machine of claim 1, wherein the oil delivery nozzle is spaced apart axially from the rotating oil distribution member.

5. An electrical machine, comprising:
    a stator including a plurality of stator windings;
    a rotor in magnetic cooperation with the stator, the rotor including a plurality of cooling passages extending therethrough, each cooling passage including an inlet for receiving oil and an outlet for discharging the oil;
    a rotating oil distribution member coupled to the rotor, the rotating oil distribution member including a radially inward portion and a radially outward portion, the radially outward portion being disposed adjacent to the inlets of the plurality of cooling passages;
    a stationary oil delivery nozzle constructed to discharge oil toward the radially inward portion of the rotating oil distribution member, wherein the rotating oil distribution member is constructed to receive the oil discharged by the oil delivery nozzle, and to direct the oil to the inlets of the cooling passages to cool the rotor,
    wherein the rotating oil distribution member includes an inner surface and an outer surface; and
    wherein the oil delivery nozzle is constructed to direct the oil to the inner surface.

6. The electrical machine of claim 5, wherein the oil delivery nozzle is constructed to direct the oil to a rotating surface; and wherein the rotating surface is constructed to sling the oil radially outward and into contact with the inner surface of the rotating oil distribution member.

7. The electrical machine of claim 5, wherein the rotating oil distribution member is constructed to increase a pressure of the oil received from the oil delivery nozzle.

8. The electrical machine of claim 7, wherein the rotating oil distribution member is constructed to drive the oil into the inlets of the cooling passages, along and through the cooling passages and to discharge the oil from outlets of the cooling passages.

9. The electrical machine of claim 5, wherein the oil delivery nozzle is constructed to direct the oil to the outer surface of the rotating oil distribution member.

10. The electrical machine of claim 9, wherein the stator windings include a winding overhang; and wherein the rotating oil distribution member is disposed at least partially directly radially inward of the winding overhang and constructed to sling the oil outward and into contact with the winding overhang to cool the winding overhang with the oil.

11. An electrical machine, comprising:
    a stator having a plurality of stator windings, the stator windings including a first winding overhang;
    a rotor in magnetic cooperation with the stator;
    an oil distribution member coupled to the rotor, the oil distribution member being disposed at least partially directly radially inward of the first winding overhang; and
    at least one oil delivery nozzle constructed to discharge oil toward the oil distribution member, wherein the oil distribution member is constructed to sling the oil outward and into contact with the first winding overhang to cool the first winding overhang with the oil,
    wherein the oil distribution member is constructed to provide oil cooling to the rotor and to the stator windings simultaneously.

12. The electrical machine of claim 11, wherein the rotor includes a plurality of cooling passages extending therethrough, each cooling passage having an inlet for receiving the oil; wherein the oil distribution member is constructed to direct oil to the inlets of the cooling passages and through the cooling passages to cool the rotor.

13. The electrical machine of claim 12, wherein the stator windings have a second winding overhang; wherein each cooling passage includes an outlet for discharging the oil, and wherein the outlets are constructed to sling the oil into contact with the second winding overhang to cool the second winding overhang with the oil.

14. The electrical machine of claim 12, wherein at least one oil delivery nozzle is constructed to direct the oil to a rotating surface; and wherein the rotating surface is constructed to sling the oil radially outward and into contact with the oil distribution member.

15. The electrical machine of claim 14, wherein the oil distribution member is constructed to increase a pressure of the oil received from the oil delivery nozzle and supply pressurized oil to the inlets of the cooling passages.

16. The electrical machine of claim 11, wherein the oil distribution member is conical.

17. The electrical machine of claim 11, wherein the at least one oil delivery nozzle is spaced apart axially from the oil distribution member.

18. The electrical machine of claim 11, wherein the oil distribution member includes an inner surface and an outer surface; and wherein the at least one oil delivery nozzle is constructed to direct the oil to both the inner surface and the outer surface.

19. The electrical machine of claim 18, wherein the at least one oil delivery nozzle is constructed to vary the amount of oil directed to the inner surface and to vary the amount of oil directed to the outer surface.

20. The electrical machine of claim 11, wherein the at least one oil delivery nozzle is constructed to vary the amount of oil provided to the rotor and to vary the amount of oil provided to the stator windings.

* * * * *